United States Patent [19]

Fuller et al.

[11] Patent Number: 4,807,340
[45] Date of Patent: Feb. 28, 1989

[54] CONCENTRIC INJECTION FLOW PIPE JUNCTION FABRICATION METHOD

[75] Inventors: Harold A. Fuller; Michael L. Shepard, both of Covington, Va.

[73] Assignee: Westvaco Corporation, New York, N.Y.

[21] Appl. No.: 149,483

[22] Filed: Jan. 28, 1988

[51] Int. Cl.⁴ .............................................. B21D 53/00
[52] U.S. Cl. .................................. 29/157 R; 29/401.1
[58] Field of Search ............ 29/157 R, 157 A, 157 T, 29/401.1, 455 R; 285/138, 142, 182

[56] References Cited

U.S. PATENT DOCUMENTS

| | | | |
|---|---|---|---|
| 649,473 | 5/1900 | Palmer | 29/157 R |
| 1,608,180 | 11/1926 | Nathanson et al. | 29/157 R |
| 2,219,599 | 10/1940 | Penote | 29/157 R |
| 2,225,862 | 12/1940 | Eckman | 29/157 R |

Primary Examiner—Howard N. Goldberg
Assistant Examiner—Irene Cuda
Attorney, Agent, or Firm—W. A. Marcontell; R. L. Schmalz

[57] ABSTRACT

A pipe junction for concentrically mixing fluid flow streams is fabricated entirely of stock dimension plate and pipe materials with a faired main stream flow around the disruption of the injection flow pipe penetration and with all assembly seams, welded or bonded, externally applied. A slot is cut into the main flow pipe to receive a close tolerance fit of a prefabricated fillet assembly with the injection flow pipe. A continuous seam around the main flow pipe slot perimeter seals the main flow channel interior and structurally reinforces the concentric position of injection flow pipe.

1 Claim, 4 Drawing Sheets

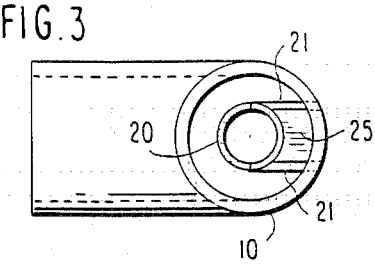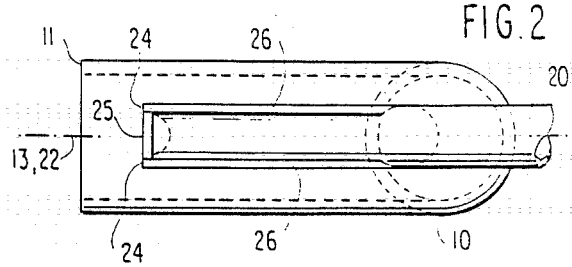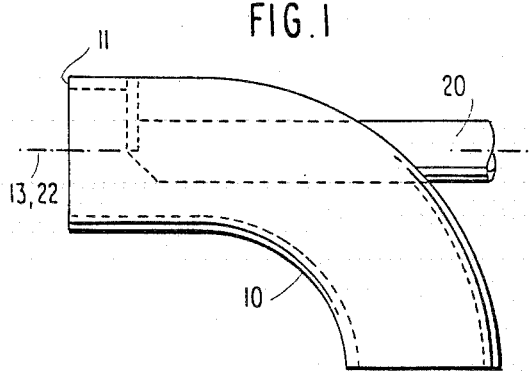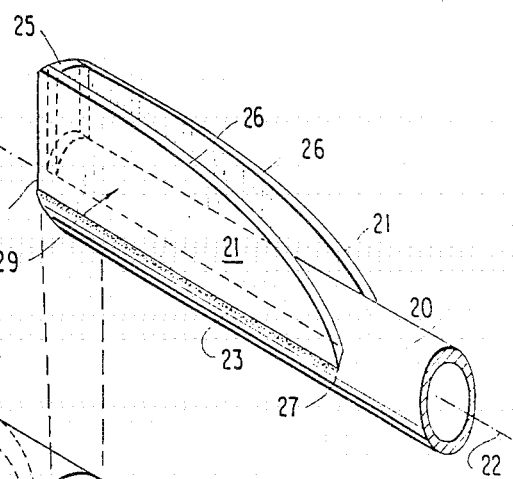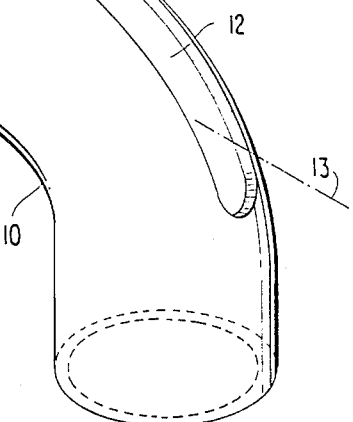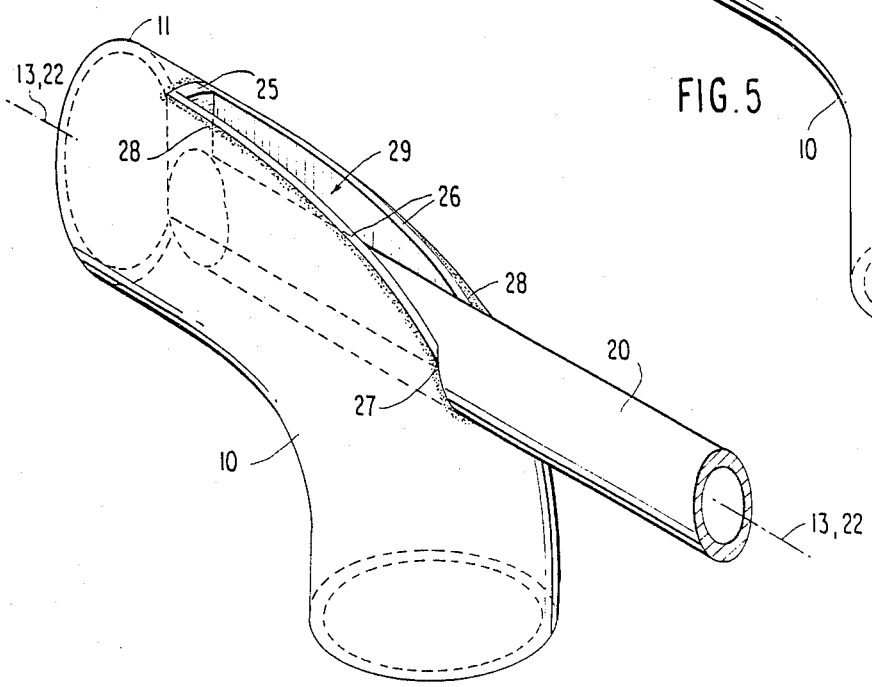

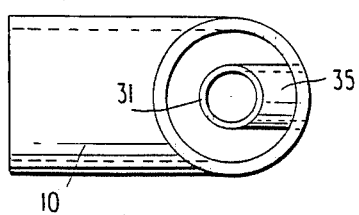
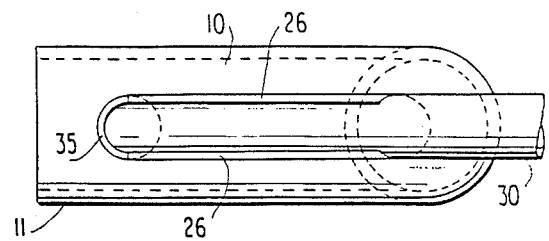
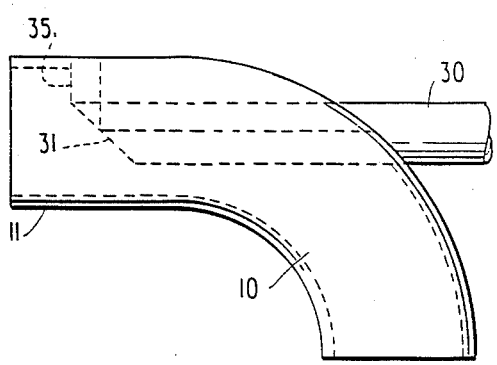
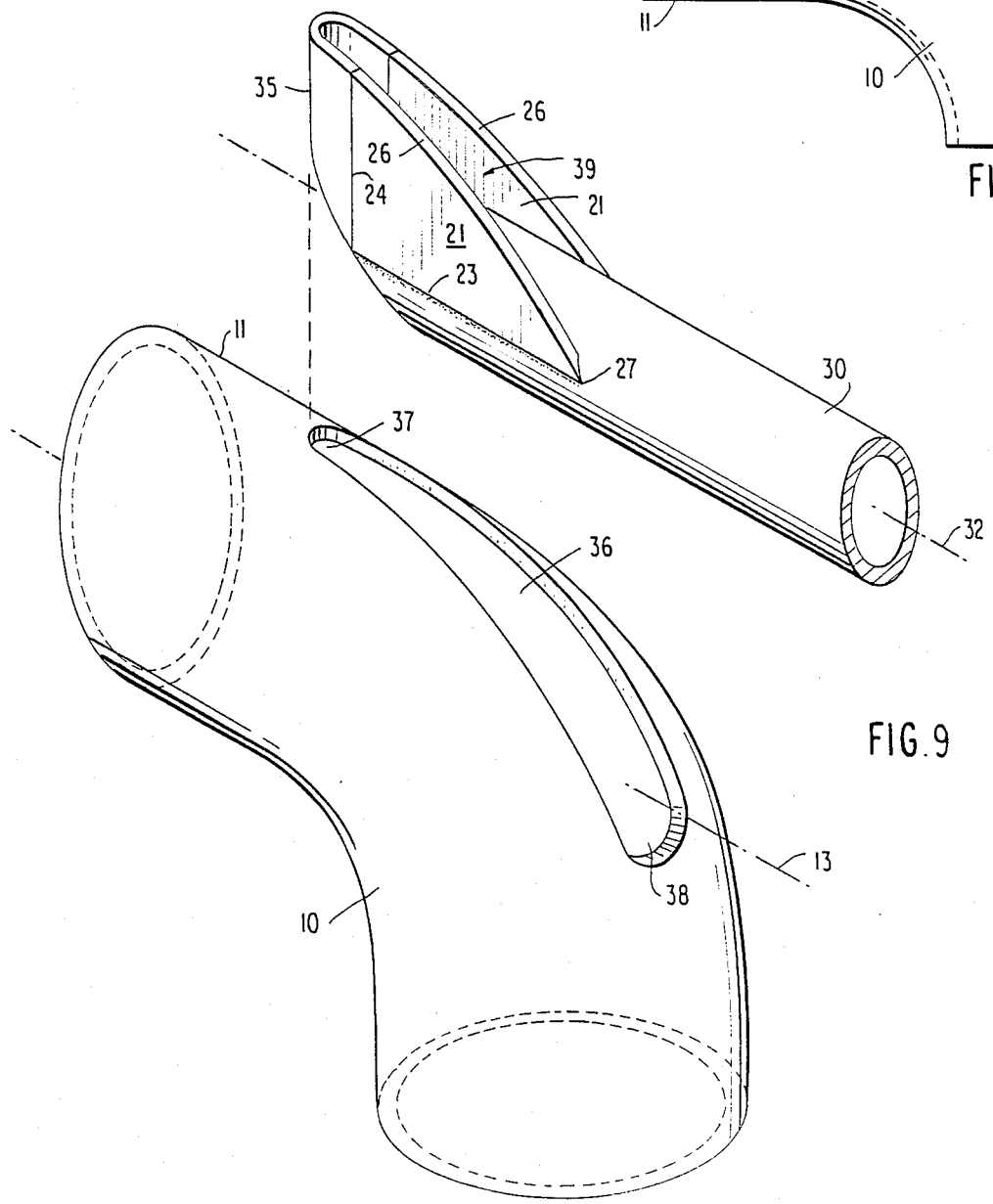

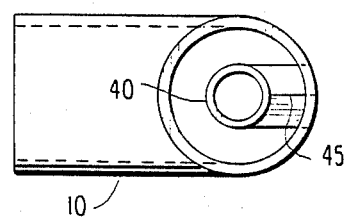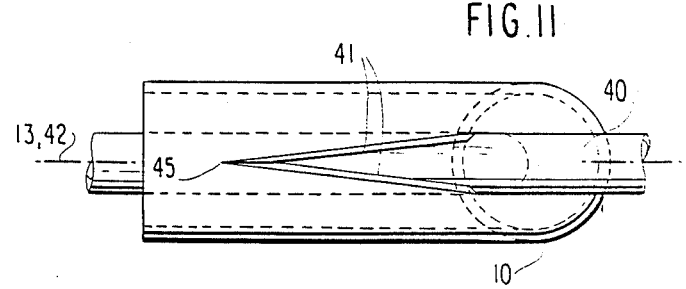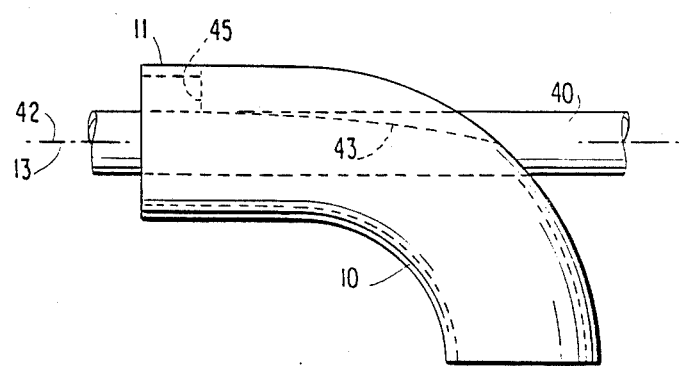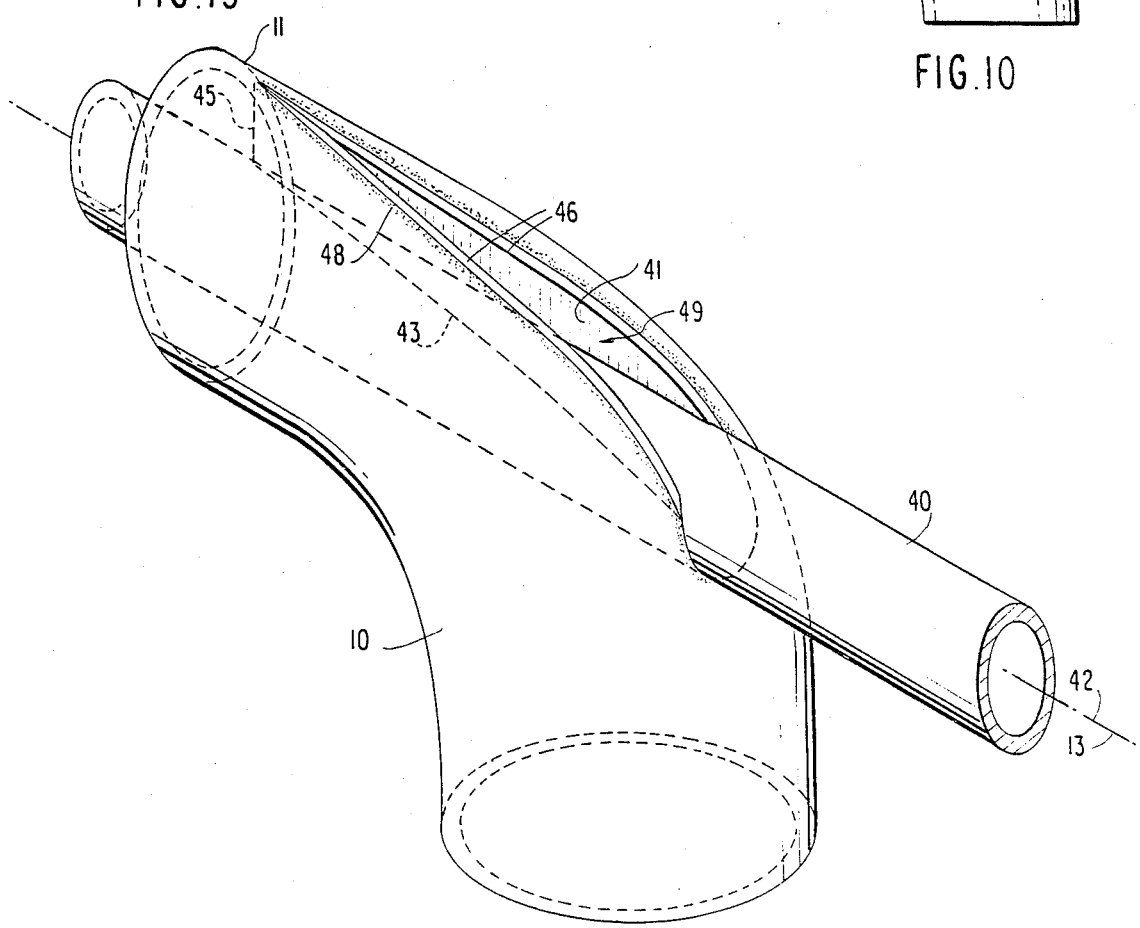

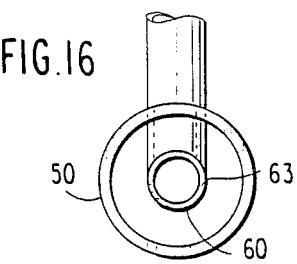
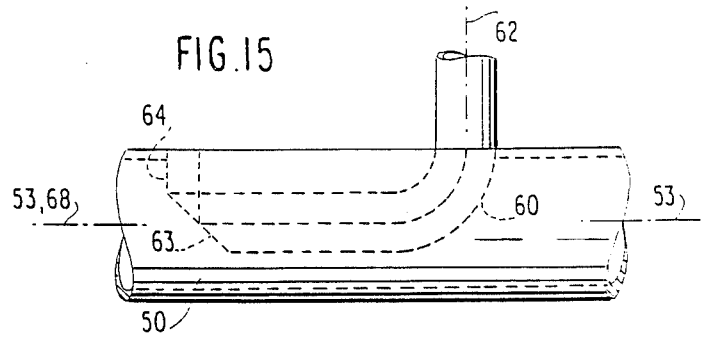
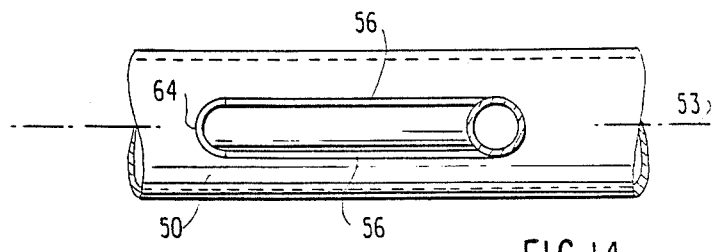
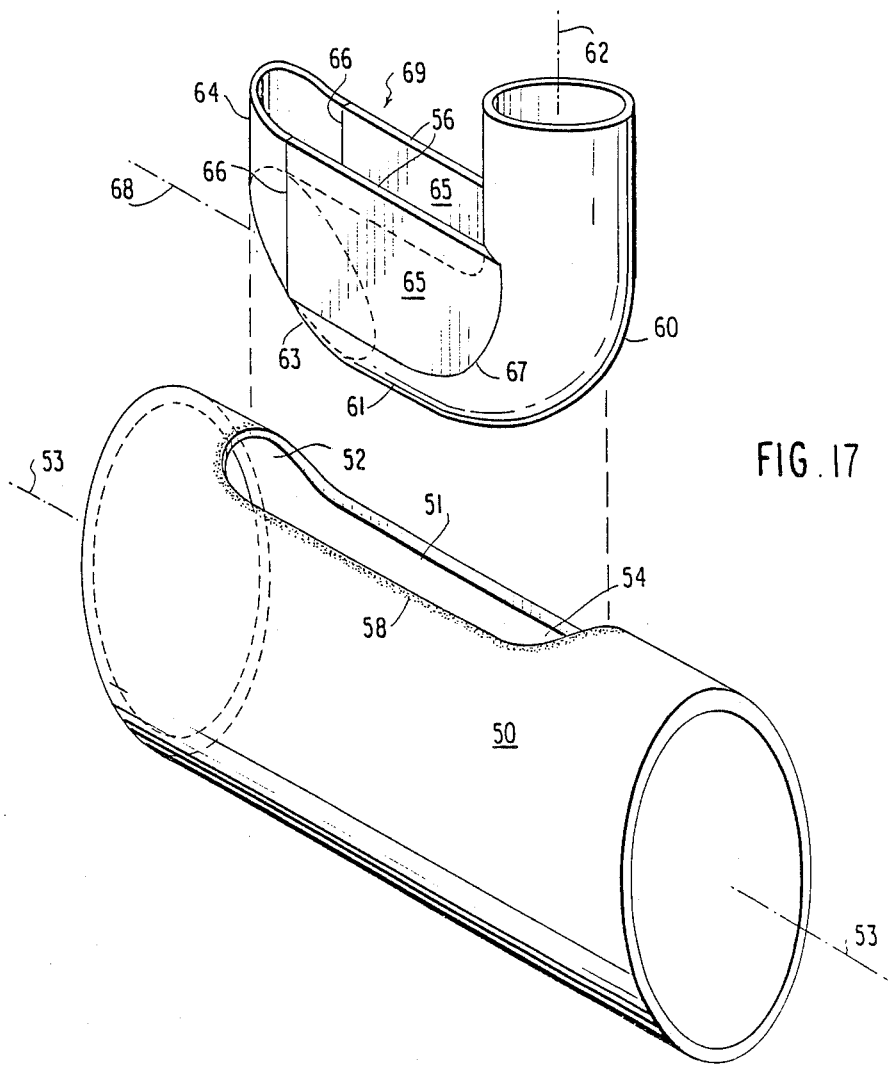

CONCENTRIC INJECTION FLOW PIPE JUNCTION FABRICATION METHOD

BACKGROUND OF THE INVENTION

1. Field Of The Invention

The present invention relates to the art of large pipe fabrication. More particularly, the present invention relates to the structural fabrication of a coaxial flow mixing joint.

2. Prior Art

There are countless process and flow conditions in industry that require the blending of two or more fluid flow streams. Unless one of the flow streams is particularly turbulent and the two streams are of substantially the same density, a simple T-junction will not accomplish immediate blending. The injected flow stream will merely stratify within the mixed stream pipe.

For ideal mixing, an injected flow stream should be released coaxially of the main flow stream. In other words, the injected flow stream conduit should penetrate the main flow stream conduit wall and internally align concentrically and coaxially with the main flow conduit.

Although this principle is well understood, physical fabrication of such a pipe joint is intricate. Penetration of the main flow pipe wall by the injected flow pipe constitutes a flow stream disruption in the main flow channel. Moreover, the disruption may represent a significant flow area reduction causing changes in the main flow stream direction and velocity. These changes cause dynamic eddys, stagnation zones and periodic force and flow gradients around the injected flow pipe. The result is vibration and structural stress. Such vibration and stress eventually fatigues and breaks the welds holding the pipe assembly together.

When the main flow stream is a mixture or suspension such as an aqueous slurry of cellulose fiber and water, fiber flocs and lumps can form in the stagnation zone on the downstream side of the injected flow pipe which are periodically returned to the main flow stream to be ultimately found as blemishes in a finished paper web.

Responsive to these known difficulties arising from concentric injection flow pipe junctions, prior art practice has attempted several solutions. To structurally reinforce the concentrically suspended, interior portion of the injected flow pipe, struts or webs have been welded between the outer surface of the interior pipe and the inner surface of the exterior or main flow pipe. This procedure is possible only in those cases where the interior of the main flow pipe is accessible to the welder. Furthermore, struts and/or webs in this position tend to aggravate dynamic flow disturbances started by the injected flow pipe penetration.

To fair the flow stream around the injected flow pipe, fillets have been constructed of polyester and epoxy resin to fill the stagnation volume behind (downstream of) the injected flow pipe penetration zone and along the concentrically located leg of the injected flow pipe. This procedure also requires manual access to the main flow pipe interior. Additionally, the composite fillet is susceptible to fracture and crumbling from which free moving particles are removed and carried downstream into pumps valves and other flow control equipment.

It is, therefore, an object of the present invention to provide a fabrication technique for concentric, injection flow, pipe junctions that fair the flow stream around the injected flow pipe with securely welded or bonded structural partitions.

Another object of the present invention is to provide adequate structural reinforcement for the concentrically a concentric injection flow pipe junction.

Another object of the present invention is to provide an assembly and fabrication technique for a concentric injection flow pipe junction by which all joints and seams are externally accessible for quality welding or bonding.

SUMMARY

These and other objects of the invention are obtained by welding or bonding the edges of plates or sheets along opposite sides of an injected flow pipe to project through the main flow pipe wall region. Such plates are aligned and shaped to seal off the flow stagnation volume downstream of the injected flow pipe penetration zone where the injected flow pipe physically penetrates that annulus of main flow stream channel between the outer surface of a concentrically positioned injection flow pipe and the inner surface of the main stream carrier pipe. The boundary of this sealed stagnation volume, as projected upon the main flow pipe wall is physically removed (cut out) from the main flow pipe structure to permit entry of the injection flow pipe and attached stagnation volume enclosing wall plates. Where the plates and injection flow pipe intersect with the outer surface of the main flow pipe, a continuous weld seam is applied around the full perimeter of the main flow pipe cut-out thereby sealing the main flow channel from the stagnation zone and the exterior surrounding the main flow pipe.

BRIEF DESCRIPTION OF THE DRAWINGS

Relative to the drawings wherein like reference characters designate like or similar elements throughout the several figures of the drawings: FIG. 1 through 3 are three respective orthographic views of a first embodiment of the invention. FIG. 4 is a perspective view of the first invention embodiment in combined assembly. FIG. 5 is an exploded assembly perspective of the first invention embodiment. FIGS. 6 through 8 are three respective orthographic views of a second embodiment of the invention. FIG. 9 is an exploded assembly perspective of the second embodiment of the invention. FIGS. 10 through 12 are three respective orthographic views of a third embodiment of the invention. FIG. 13 is a perspective view of the third invention embodiment in combined assembly. FIGS. 14 through 16 are three respective orthographic views of a forth embodiment of the invention. FIG. 17 is an exploded assembly perspective of the forth embodiment of the invention.

DESCRIPTION OF THE PREFERRED EMBODIMENTS

Industrial piping is generally assembled from prefabricated basic pipe components such as straight pipe joints, flanges, elbows, tees and crosses. The most commonly used materials are steel, stainless steel and resin impregnated glass fiber. For a given pipe grade and nominal size, dimensions are substantially standardized. These components are frequently assembled in fabrication shops by welding or resin bonding into conveniently moved and handled units which may include two or more basic components. The units are finally positioned and joined together at the jobsite to complete a pipe system.

Standard basic piping components do not include concentric injection flow junctions. These must be fabricated from basic component materials for a specific installation. FIGS. 1-5 illustrate such a fabrication as a primary embodiment of the present invention. This embodiment comprehends the penetration of a larger, main flow stream pipe at an elbow 10 by a smaller diameter straight pipe joint 20 carrying the injection flow fluid. Straight edge portions 23 of fillet walls 21 are attached to diametrically opposite, longitudinal surface elements of the injection flow pipe 20. Attachment will be by welding or resin bonding depending on the base material of the pipe. These fillet walls 21 are cut from compatible material plate sections. The fillet wall end cut edges 24 are usually perpendicular to the pipe surface edges 23. Fillet end-wall 25 fills the space between the end cut edges 24 within the annular section between the outer surface of the injection flow pipe 20 and the outer surface of main flow pipe 10.

A third edge 26 of the fillet walls 21 is curved to fit the outer surface profile of the main flow pipe 10 as intersected by the plane of the fillet walls 21 when the axis of the injection flow pipe 22 is superimposed on the axis 13 of the main flow stream elbow 10.

The main flow stream elbow 10 is slotted along the convex wall thereof with an opening 12 of such length and width to accept insertion of the prefabricated fillet assembly 26. When positioned with the axes 13 and 22 superimposed, a continuous closure seam 28 is formed between wall of main flow elbow 10 and the perimeter defined by the upper edge of fillet end wall 25, the curved edge 26 of fillet side walls 21 and the exterior surface elements of the pipe 20 linking the fillet wall points 27. This seam 28 is closed by an externally applied, continuous weld bead to complete the joint assembly.

Although FIGS. 1-5 illustrate the fillet walls as extended to the terminal end of injection pipe 20, it will be understood that the invention is not so limited. An injection flow pipe terminus may be projected beyond the fillet wall edge 24 and inserted in a lesser length slot 12 by sliding the fillet assembly into the slot parallel with the axis 13.

While the abrupt end wall 25 to this FIG. 1-5 embodiment of a fillet assembly 29 represents a flow stagnation zone, the area is considerably smaller than the projected profile area of the pipe 22 and is of no consequence to some flow streams. Alternatively, this embodiment of the invention is most easily fabricated entirely from sheet or plate stock.

In the FIGS. 6-9 embodiment of the invention, the fillet downstream end is completely faired for most fluids and flow conditions. The injection flow straight pipe 30 is given a 45° bevel at its terminal end 31. An orthographic projection of the bevel is a circle. Accordingly, a longitudinally split section 35 of the same pipe size used as the injection flow carrier 30 may be used as the fillet assembly 39 end wall 35. In other respects, such as the fillet side walls 21 and side wall edges 23, 24 and 26, the invention description is the same as described by FIGS. 1-5.

Slot 36 in the wall of main stream flow elbow 10 is given a semicircular end perimeter at both ends thereof 37 and 38. The fillet assembly 39 may be inserted into the slot 36 either transversely of the axes 13 and 32 or parallel therewith.

When assembled, a single, continuous exterior seam seals the entire perimeter of the assembly.

FIGS. 10-13 offer another completely faired embodiment of the invention wherein the fairing walls 41 converge to a knife-edge 45. As before, the fairing walls 41 are plate sections of compatible material. The wall edges 43 adjacent to the injection flow pipe 40, however are curved to intersect the pipe 40 surface profile about 90° of sectional arc. The exterior edges 46 are curved to fit planar projections upon the exterior surface of the main flow stream elbow 10.

A corresponding slot in the elbow 10 to receive this fillet assembly 49 is semicircular at the upstream end and pointed at the downstream end. Such knife-edge convergence of the fillet wall planes 41 therefore prevents axially transverse insertion of the assembly 49 into the elbow slot. However, axial insertion is uninhibited. For this reason, a FIG. 13 embodiment is particularly well suited for injection flow pipes 40 having a terminal end extended axially beyond the knife edge 45. As in the case of the other embodiments, a matching positionment of the fillet assembly 49 to the pointed elbow slot provides a continuous exterior seam 48 around the entire perimeter of the junction thereby sealing the elbow interior.

Described thus far have been embodiments of the invention wherein the injection flow pipe penetrates the main flow stream in the bend of a piping elbow. FIGS. 14-17 represent the invention with the main flow stream carried by a section of straight pipe 50 and the injected flow entering the junction on an axial run 62 perpendicular to the main flow axis 53. Within the envelope of the junction, however, the injection flow elbows 90° to exit along axis 68 which, in assembly, is coincident with main flow axis 53.

Structurally, the injection flow stream enters the junction within an elbow 60 and turned into a straight leg 61 which terminates with a 45° beveled end 63. A split and beveled pipe section 64 is welded to the exterior surface of pipe leg 61 along half of the beveled edge 63. This forms one enclosure end wall. The other end wall is formed by elbow 60. Fillet enclosing side walls 65 are welded to the split pipe end wall 64 along the split edge 66 thereof. Inside edge 67 parallels the injection flow discharge axis 68 from edge 64 and arcs 90° to terminate with outside edge 56. The perimeter of edge 67 is welded to outside surface tangentially with elbow 60.

This filet assembly 69 is inserted along a line transverse to the main flow pipe axis 50 into a slot 51 having semicircular ends 52 and 54. Correctly positioned, the fillet wall ends and a semicircular portion of elbow 60 are welded to the wall of main flow pipe 50 along a continuous seam 58 around the full perimeter of slot 51.

Four specific embodiments of our invention have been disclosed, each comprising features or elements that may be obviously combined in different assemblies to form additional embodiments. Having therefore described the preferred embodiments of our invention:

We claim:

1. A method of fabricating a pipe junction wherein the wall of a main fluid carrier conduit is penetrated by an injection fluid carrier conduit for positionment of an injection fluid discharge flow channel that is substantially parallel and coaxial with a main fluid flow channel and direction, said method comprising the steps of:
    (a) securing a flow stagnation zone fairing enclosure to the outer wall surface of said injection fluid carrier conduit;
    (b) removing sufficient material from the wall of said main fluid carrier conduit to permit the positionment of said injection fluid carrier conduit and attached enclosure into the resulting opening;
    (c) securing said fairing enclosure to the outer wall fluid seal about the entire perimeter of said main fluid carrier conduit opening.

* * * * *

UNITED STATES PATENT OFFICE
CERTIFICATE OF CORRECTION

PATENT NO. : 4,807,340
DATED : February 28, 1989
INVENTOR(S) : Harold A. Fuller and Michael L. Shepard It is certified that error appears in the above-identified patent and that said Letters Patent is hereby corrected as shown below:

Column 4, line 65 (Claim 1, line 14), following "wall" insert --surface of said main fluid carrier conduit with a continuous--.

Signed and Sealed this

Twenty-fifth Day of July, 1989

Attest:

DONALD J. QUIGG

Attesting Officer

Commissioner of Patents and Trademarks